(No Model.)  2 Sheets—Sheet 1.

J. SOLTER.
Can Soldering Machine.

No. 238,175.   Patented Feb. 22, 1881.

Witnesses,
W. A. Bertram
G. H. Pistel

Inventor,
John Solter.

by
R. D. Williams
Attorney.

(No Model.) 2 Sheets—Sheet 2.
J. SOLTER.
Can Soldering Machine.
No. 238,175.        Patented Feb. 22, 1881.
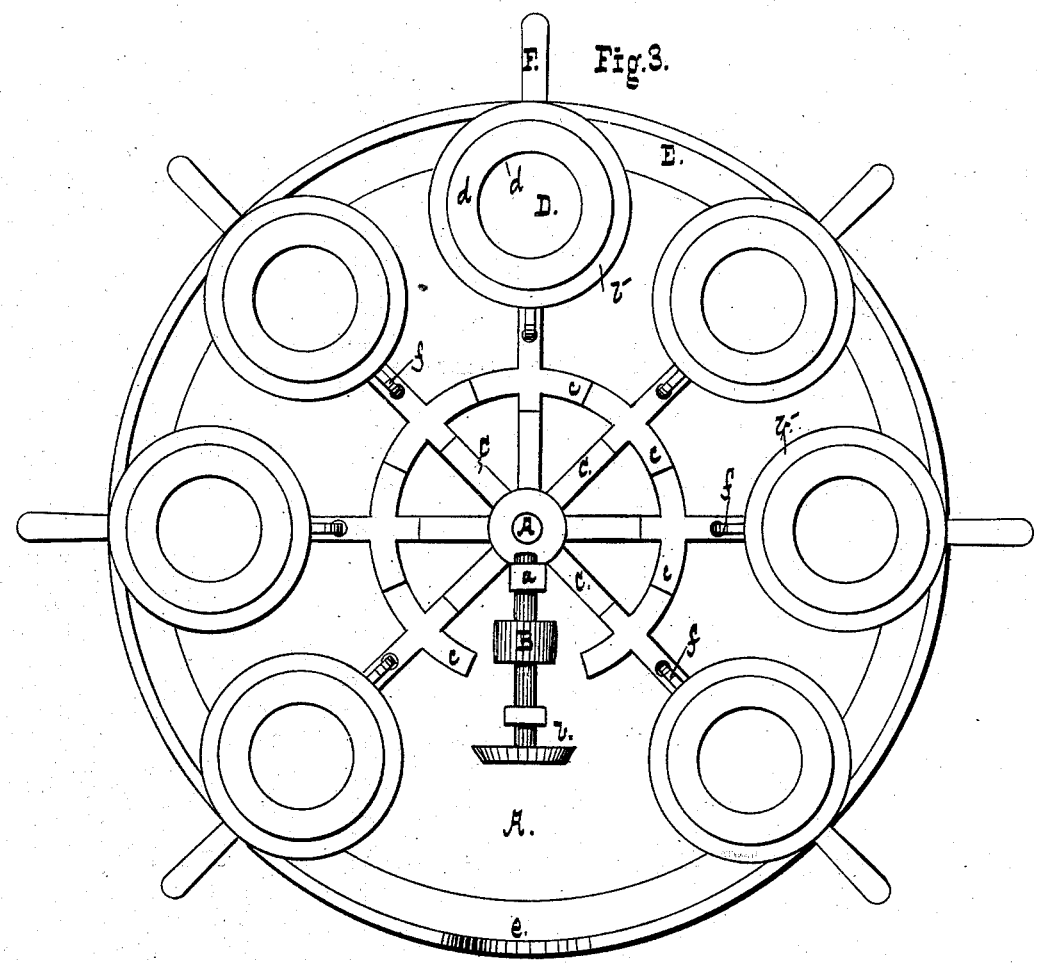
Witnesses,
N. A. Bertman
C. H. Pettit
Inventor,
John Solter.
by
R. D. Williams
Attorney.

UNITED STATES PATENT OFFICE.

JOHN SOLTER, OF BALTIMORE, MARYLAND, ASSIGNOR OF ONE-HALF TO GEORGE L. KREBS, OF SAME PLACE.

CAN-SOLDERING MACHINE.

SPECIFICATION forming part of Letters Patent No. 238,175, dated February 22, 1881.

Application filed January 7, 1881. (No model.)

*To all whom it may concern:*

Be it known that I, JOHN SOLTER, of Baltimore city, State of Maryland, have invented certain new and useful Improvements in Can-Soldering Machines; and I hereby declare the same to be fully, clearly, and exactly described as follows, reference being had to the accompanying drawings, in which—

Figure 1:
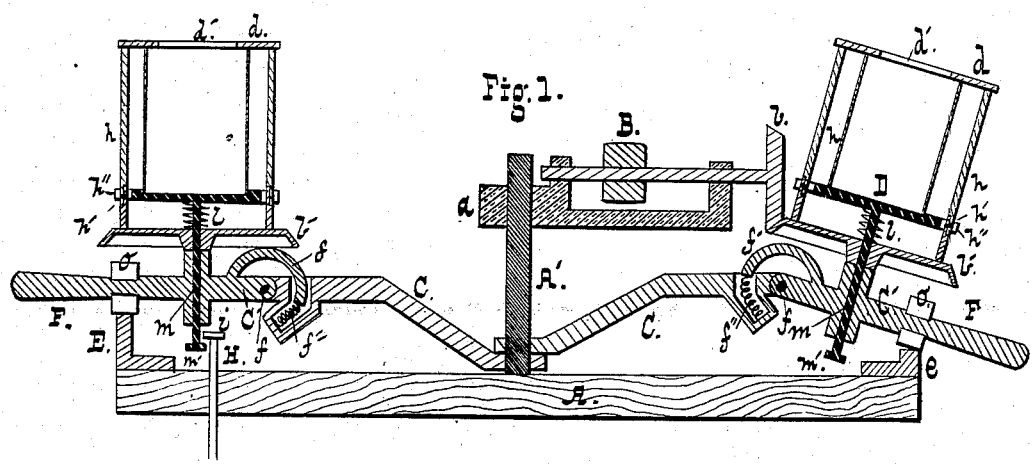
Figure 2:
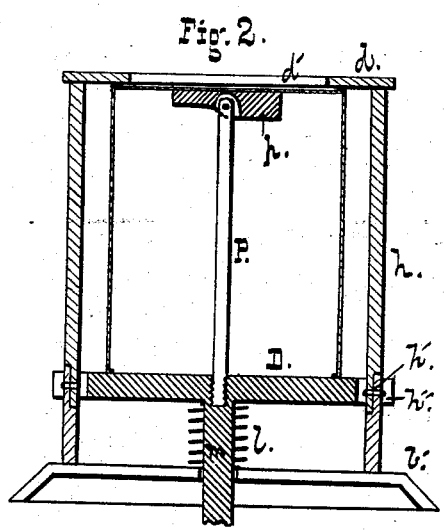

Figure 1 is a transverse vertical sectional view of the machine. Fig. 2 is an enlarged view of one of the can-holders, also in section. Fig. 3 is a plan view of the machine.

My invention relates to that class of machines for soldering the heads of cans in which a number of can-holders are brought successively in front of the operator who solders them, and tilt to an inclined position while being soldered. These machines have heretofore consisted of a revolving table having a series of disks near the periphery, which disks were provided with clamps for holding the cans. An operator on one side of the machine placed the cans on the disks, while another operator on the opposite side soldered the seam. A serious objection to this arrangement lies in the fact that the entire series of can-holders moved ith the table, so that, should the operator who soldered the can perceive a flaw in his work after he supposed it finished and he had moved the table partly around, the reverse rotation of the table necessary to bring the imperfect can in front of him to solder it disturbed the work of the person on the opposite side of the table. I obviate this difficulty by dispensing with the table and disk feature and mount the ca olders on a series of independently movable arms, whereby, in the case above mentioned, the holder sustaining the imperfect can may be moved back without disturbing the others, and a great saving of time and convenience of operating result.

My invention may be said, therefore, to consist, generically, in a series of disks or can-supports mounted upon arms pivoted about a common axis—*i. e.*, an axis common to all of them—each arm being susceptible of a movement in the plane of its rotation about the axis independently of the rest.

Specifically, my invention may be said to consist in certain features and details of construction, as hereinafter fully set forth.

One important feature of my invention consists in adapting the machine to the soldering of square cans, such as are used for containing raw oysters, and in which the heads are inserted from the inside of the can. The device for this purpose is shown in Fig. 2 of drawings.

Proceeding to a description of the device, A is a suitable support, having a central standard, A', on which are mounted several arms, C, preferably seven in number. The arms C are jointed at $f$ to arms C', having terminal handles F, and are provided with transverse pieces $c$, which lie in the same plane and abut, holding all but two of the arms C equidistant.

In the arms C' are mounted the can-holders. These consist of rods $m$, which slide vertically through bearings in the arms C' and carry terminal disks D. Disks $b'$ are mounted on the rods $m$, above the arms C', and are provided with rods $h$, jointed at $h'$, and connected at their upper ends to plates $d$, having central apertures $d'$. The disks D are normally pressed upward by means of springs $l$, and have on opposite sides slots $h''$, which embrace the joints of the rods $h$. On the lower ends of the rods $m$ are disks $m'$.

From the arms C' project curved rods $f'$, which enter sockets in the arms C, where they encounter springs $f''$, whereby the rollers $o$ on the arms C' are pressed down on the railway E. At one side of the table A the height of the railway is reduced, as at $e$, whereby when the can-holders pass that point they tilt, as shown in Fig. 1.

On the central shaft, A', is a bearing, $a$, in which is mounted a shaft carrying a pulley, B, and disk $b$. The latter is located opposite the lowest portion of the railway E, and is so arranged that the disk $b$ encounters the peripheries of the disks $b'$ and causes the can-holders to turn at that point. A rod, H, carries a disk, $i$, and is attached to a treadle. (Not shown.)

In operation, as the disks $m'$ come under the disk $i$ the rod H is depressed, drawing down the disk D. A headed can is then placed on the disk D, and between it and the ring $d$. On releasing the treadle the disk D rises, clamping the can. The operator then seizes the handle F of the next arm C' to the right and brings it in front of him to clamp a second can. In so doing the transverse piece $c$ of the second arm encounters that of the first one carrying the clamped can, and drives it before it through an arc of forty-five degrees. Presently the first clamped can arrives at the opposite side of the machine, when the roller $o$ descends the incline $e$ and the disk $b'$ encounters the disk $b$, which is made to revolve continuously by a belt on the pulley B. The disk $b'$ begins to turn, and the operator opposite it throws a lump of solder into the can, introduces his iron through the opening $d'$, and solders the seam. Obviously, in lieu of this the solder may be melted by a flame from the outside or inside of the can. When the soldering is complete the operator moves the can-holder to the left and draws the next one in front of him. As the first can is moved to one side opportunity is afforded for examining the seam on the outside, and if a flaw be perceived the operator moves the holder back and resolders it. This operation in nowise interferes with the work on the other side of the table, as a space is afforded for reverse rotation of the can-holding arm, as will be readily understood. The soldered cans are finally removed as they come opposite the first operator, and so on.

The object of jointing the arms $h$ is as follows: So-called "square cans" have inside heads, which are pressed upward for soldering against the edge flanges of the walls by means of what are known to the trade as "tumble-blocks," mounted on suitable standards. The centers of the disks D are threaded, (see Fig. 2,) and in the holes are screwed the rods P, having the usual tumble-blocks $p$ pivoted to their upper ends. To place the can thereon it is of course necessary to move the rods $h$ to one side, and facility for this is afforded by the joint $h'$. As the disk D is depressed the rods $h$ fall to one side and the can is placed over the tumble-block, as usual. The rods $h$ are then raised to a vertical position over the can-lid and the disk D is allowed to rise. The slots $h''$ embrace the joints $h'$ and hold the rods vertical while the tumble-block presses the head against the end flange. The upper clamp, $d$, must of course be of such form as to leave the seam unobstructed for soldering.

In soldering square cans the holders are not caused to revolve by means of the disks $b$, as a continuous revolution would not answer in soldering a straight seam. The can-holders are turned successively through a quadrant by hand and the sides are soldered in succession.

In lieu of the rods $f'$ and springs $f''$, a simple flat spring may be riveted to either section of the arms and be made to bear on the other; and in lieu of the lugs $c$ a series of pins may be secured on the collar of each arm C and enter a slot in the collar of the arm below it.

What I claim is—

1. In a can-soldering machine, a series of arms pivoted about a common axis and carrying in their ends revolving can-holders, each arm being movable in the plane of its rotation about said axis independently of the others, as set forth.

2. In a can-soldering machine, a series of arms pivoted about a common axis and carrying in their ends revolving disks and clamping devices for securing the cans thereon, each arm being movable in the plane of its rotation about the said axis independently of the others, as set forth.

3. In a can-soldering machine, a series of revolving can-holders mounted in the ends of arms which are pivoted about a common axis, each susceptible of motion in the plane of its rotation about the same independently of the others, and a railway having a reduced portion adapted to tilt the can-holders as they traverse it, as set forth.

4. In a can-soldering machine, a series of jointed arms pivoted about a common axis and each susceptible of motion in the plane of its rotation about said axis independently of the others, and a series of revolving can-holders mounted in the ends of said arms, and means for causing them to tilt as they traverse a part of their path around the central axis, as set forth.

5. In a can-soldering machine, a series of arms carrying revolving can-holders and pivoted about a common axis and susceptible of motion about the same, each independent of the others, and mechanism, substantially as described, for limiting the approximation of each arm to the next one on either side.

6. In a can-soldering machine, a series of arms pivoted about a common axis and carrying revolving can-holders, and having each a transverse lug adapted, as described, to abut against a similar lug on the next arm, whereby the approximation of the arms to each other is limited and each is adapted to drive the next one before it in rotation about the shaft, but is itself free to be moved backward, as set forth.

7. In a can-soldering machine, a series of arms pivoted about a common axis and each susceptible of motion about the same in the plane of its rotation independently of the others, the said arms being provided with revolving can-holders, and being so mounted upon the common axis that a portion of the circle traversed by them is left free for the reverse rotation of one or more of them, as set forth.

8. In combination with the revolving arms and clamping-plates, the jointed rods $h$, as and for the purpose set forth.

9. In combination with the revolving arms and clamping-plates, the jointed rods $h$, tumble-blocks, and standards, as set forth.

10. In combination with the series of arms C, pivoted about a common axis, and each susceptible of rotary movement about the same independently of the others, the series of arms C', pivoted to the first, and normally depressed at their outer ends by means of springs $f''$, as set forth.

11. In combination with the arms C, pivoted about a central axis and having lugs $c$, the arms C', carrying the revolving can-holders and having rollers $o$, and the railway E, as set forth.

JOHN SOLTER.

Witnesses:
R. D. WILLIAMS,
J. C. GITTINGER.